June 22, 1937. W. I. JONES 2,084,559
SNAP FASTENER MEMBER
Filed July 23, 1935
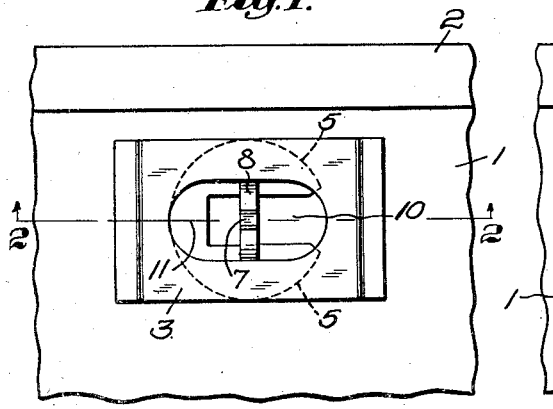
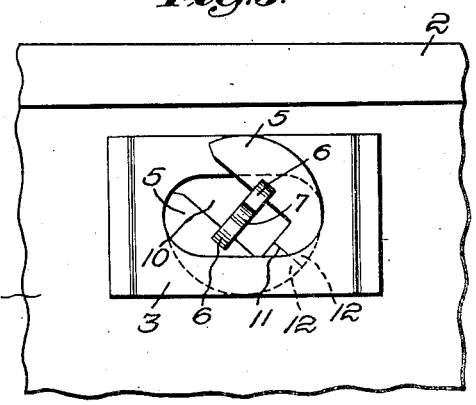
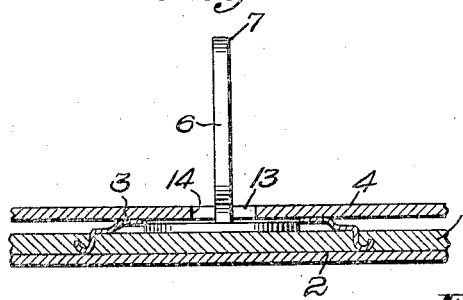
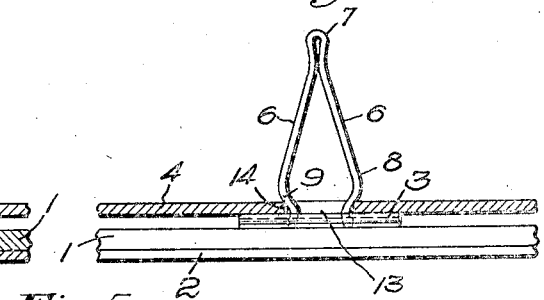
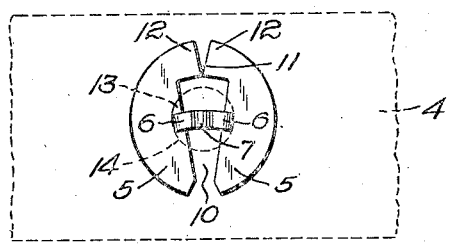
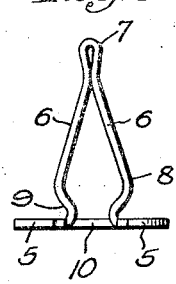
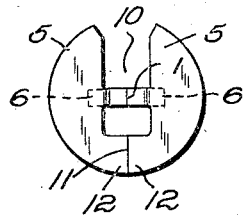
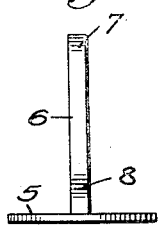
Inventor:
Walter I. Jones Patented June 22, 1937

2,084,559

UNITED STATES PATENT OFFICE 2,084,559

SNAP FASTENER MEMBER

Walter I. Jones, Arlington, Mass., assignor to United-Carr Fastener Corporation, Cambridge, Mass., a corporation of Massachusetts Application July 23, 1935, Serial No. 32,709

10 Claims. (Cl. 24—213)

My invention aims to provide improvements in snap fastener members.

In the drawing which illustrates a preferred embodiment of my invention:

Figure 1 is a plan view of the inside of a portion of an upholstery covering structure showing a holding staple and my improved fastener member completely assembled therewith;

Fig. 2 is a section taken on the line 2—2 of Fig. 1 showing the upholstery structure secured to the framework of an automobile;

Fig. 3 is a view similar to that shown in Fig. 1, but showing the method by which the fastener is applied to the structure;

Fig. 4 is a side elevation of the installation shown in Fig. 2;

Fig. 5 is a plan view of my fastener showing the twisting action which takes place when the stud is engaged with an aperture of an automobile frame;

Fig. 6 is a side elevation of my fastener member;

Fig. 7 is a bottom plan view of my fastener member; and

Fig. 8 is an end elevation of my fastener member.

At the outset I wish to have it understood that as far as I am aware my new fastener involves a new and exceedingly useful principle of operation which I believe to be novel and patentable. Furthermore, I believe my new fastener has many uses and can be made in various shapes, sizes and be of greater usefulness in some instances than any fastener heretofore known.

Merely as an example of one use of my invention I have shown by the annexed drawing an upholstery installation of well-known construction with which my improved fastener may be used. Therefore, reference may be had to my United States Letters Patent No. 2,005,670, issued June 18, 1935, for specific details of the installation.

Referring now to the drawing I have shown a portion of an upholstery panel having a backing 1 of cardboard or the like, a finish covering 2 and an oval hole staple 3. I have also shown a piece of sheet metal 4 to which the upholstery is applied.

My improved snap fastener stud is preferably made from a single piece of sheet metal also preferably carbon steel hardened and drawn to give strength and lasting yielding quality to the fastener. When made of sheet metal it is blanked out of a strip and has a base formed of two feet 5—5 on the ends of a narrow band which forms the shank of the fastener. The shank has two oppositely spaced legs 6—6 having their outer ends joined by a loop end 7 and their inner ends are joined to the inner edges of the feet 5—5 as shown in Figs. 6 and 7. These legs 6—6 are bowed outwardly relative to each other so as to form a head portion 8 and a neck 9. Thus the legs diverge from the base then converge to the loop end as clearly shown in Fig. 6.

The feet 5—5 are arranged to provide a base which in this case presents a sort of C-shaped appearance with the legs extending from about the center of the base. The inner opposed edges of the feet are preferably spaced apart (Fig. 7) from one edge of the base to a point passing through the center and passed the points where the legs join the feet. Then the edges are in contact, or normally approximately so, from the space 10 to the opposite edge of the base thus indicating a slit 11. The resulting contacting or abutting portions 12—12 are important, as will be shown by an explanation of the operation of the stud.

While I am aware that a stud having opposed bowed legs is not new, I am not aware of any such fastener that has a twisting action taking place in the legs when being engaged with a suitable socket. Such a twisting action has, I have found, decided advantages over the usual action because the action of the fastener can be better controlled and furthermore a more perfect yielding action can be had the better to adapt the fastener to variations in tolerance of parts with which it is used. Furthermore the fasteners embodying my invention are less apt to break and thus have a long durable life.

The twisting action taking place in the arms of my improved fastener is controlled by the abutting portions 12—12 because they act as a fulcrum during the action of the fastener. Thus when the legs 6—6 of the stud are forced through the aperture 13 in the sheet metal 4 they pass through without resistance until the converging portions contact with the wall 14 surrounding the aperture 13. Then as the legs are forced through the aperture 13 they are pressed toward each other. Since the free ends are connected there is a tendency to move the feet 5—5 toward each other. By leaving a space 10 between the feet this movement of the feet may take place but it is restricted because the abutting portions 12—12 contact and prevent a straight movement of the legs and feet. Therefore, the pressure must be relieved somewhere so the feet move toward each other about the abutting portions as a fulcrum. Thus a twisting takes place in the arms to reduce the cross-sectional area in addition to the movement of the legs toward each other so that the enlarged portion 8 may pass through the aperture 13 as shown in Fig. 5. It will be apparent to those skilled in the art that the action of the fastener may be stiffened or eased by moving the ends of the abutting portions 12—12 toward or further from the legs 6—6.

Since the twisting of the legs bring two of their edges closer together than the others, it follows that the legs may have a greater overhang and pass through a given sized aperture without setting than would be the case if twisting could not take place. This is clearly understandable by a study of Fig. 5. After the legs pass through the aperture to a position shown in Figs. 2 and 4 the legs untwist and grip the wall 14 tightly thereby holding the parts firmly together.

The space 10 is also useful in connection with an upholstery fastener because it permits the fastener to be assembled with the staple 3 by a turn-in action as described in my above-mentioned patent.

The fasteners which have been made embodying my invention are excellently working fasteners. They have a decidedly "live" spring action with practically no tendency to "set" as compared to stiff, forced or flimsy actions of previously used fasteners and they are simple, relatively inexpensive and lend themselves to quantity production.

While I have illustrated and described a preferred embodiment of my invention, I do not wish to be limited thereto, because the scope of my invention is best defined in the following claims.

I claim:

1. A snap fastener member having a base, a shank extending from said base in the form of a loop, the end of said shank away from said base being the connected portion of said loop and the ends of said loop being joined to said base, said shank being shaped to provide diverging portions extending from said base to form a stud neck, and converging portions from said diverging portions to said connected portion providing an easy aperture-entering head, said base having a slot of substantial width at one side of said shank and having abutting independent portions at the opposite side, said abutting portions cooperating with said slot to permit a torsional action of said shank when it is forced through an aperture of predetermined size.

2. A snap fastener stud formed from sheet metal and having a base, a shank extending from said base and having opposed bowed yieldable legs connected at the ends away from said base, said base having a slot of substantial width extending inwardly from one edge at one end and terminating short of the edge at the opposite end and a slit dividing said base between the inner end of said slot and the edge of said base at said opposite end, said slot and the portions of said base adjacent to said slit cooperating to permit a torsional action in the legs of said shank when said shank is contracted to pass into a stud-receiving aperture.

3. A snap fastener stud formed from sheet metal and having a base, a shank extending from said base and having opposed bowed yieldable legs, said base having a slot of substantial width extending inwardly from one edge at one end and terminating short of the edge at the opposite end and a slit dividing said base between the inner end of said slot and the edge of said base at said opposite end, said slot and the portions of said base adjacent to said slit cooperating to permit a torsional action in the legs of said shank when said shank is contracted to pass into a stud-receiving aperture, said bowed legs being joined together at their ends remote from said base and being joined to said base at opposite sides of said slot.

4. A snap fastener stud having a shank formed with two oppositely positioned bowed legs, said bowed legs being joined at one end of the shank and each of said legs having an independent foot portion of substantial area at the other end of the shank, said feet cooperating to provide a stud base, and said feet having abutable portions acting as a fulcrum to permit a torsional action of said shank when it is forced through an aperture of predetermined size.

5. A snap fastener stud having a shank formed with two oppositely positioned bowed legs adapted to move toward and away from each other, said bowed legs being joined together at one end of the shank and each of said legs having a foot portion of substantial area at the other end of the shank, said feet cooperating to provide a stud base and each foot having a cut-out portion at one side of said legs and a contacting portion at the opposite side of the legs.

6. A snap fastener stud having a shank formed with two oppositely positioned bowed legs adapted to move toward and away from each other, said bowed legs being joined at one end of the shank and each of said legs having a foot portion of substantial area at the other end of the shank, said feet cooperating to provide a stud base and each foot having inwardly extending abutting portions to permit a torsional action of said legs when they are moved toward each other.

7. A snap fastener stud having a shank formed with two oppositely positioned bowed legs adapted to move toward and away from each other, said bowed legs being joined at one end of the shank and each of said legs having an independent foot cooperating to provide a stud base, said feet being spaced from each other at one side of said legs where they join the feet to permit movement of said feet toward each other, and said feet having abutting portions at the other side of said legs whereby when said legs are forced through an apertured member the abutting portions will contact and said spaced portions of said feet will move toward each other about said abutting portions as a fulcrum thereby causing a twisting action of said legs to provide at least some of the socket-engaging action of said legs.

8. A snap fastener stud having a shank formed with two oppositely positioned bowed legs, said bowed legs being joined at one end of the shank, each of said legs having an independent L-shaped foot portion at the other end of said shank, said feet cooperating to provide a stud base and said feet having abutable portions acting as a fulcrum to permit a torsional action of said shank when it is forced through an aperture of predetermined size.

9. A snap fastener stud formed from sheet metal and having a C-shaped base, a slit completely dividing said base at that end opposite the opening and a pair of bowed legs extending from said base at the inner periphery and being connected together at their ends remote from said base, portions of each part of said base adjacent to said slit abutting to permit a torsional action of said legs when they are passed into a stud-receiving aperture.

10. A snap fastener stud having a shank formed with two oppositely positioned bowed legs adapted to move toward and away from each other, said bowed legs being joined at one end of the shank and each of said legs having a foot portion of substantial area at the other end of the shank, said feet cooperating to provide a stud base and each foot being formed with an inwardly directed extension, said extension cooperating to form a fulcrum about which said feet may be moved, permitting a collapsing of said base and a torsional action of said legs when they are moved toward each other.

WALTER I. JONES.